United States Patent
Mishra et al.

(10) Patent No.: US 9,233,799 B1
(45) Date of Patent: Jan. 12, 2016

(54) SENSING CONVEYOR FOR OBJECT CHARACTERISTIC DETERMINATION

(71) Applicant: Amazon Technologies, Inc., Reno, NV (US)

(72) Inventors: Pragyana K. Mishra, Seattle, WA (US); Debanjan Mukherjee, San Jose, CA (US)

(73) Assignee: Amazon Technologies, Inc., Reno, NV (US)

(*) Notice: Subject to any disclaimer, the term of this patent is extended or adjusted under 35 U.S.C. 154(b) by 15 days.

(21) Appl. No.: 14/304,561

(22) Filed: Jun. 13, 2014

(51) Int. Cl.
*B07C 5/00* (2006.01)
*B65G 43/08* (2006.01)
*B65G 47/00* (2006.01)

(52) U.S. Cl.
CPC . *B65G 43/08* (2013.01); *B07C 5/00* (2013.01); *B65G 47/00* (2013.01)

(58) Field of Classification Search
CPC .......... B65G 43/08; B65G 1/137; B07C 5/08; B07C 5/083; B07C 5/00
See application file for complete search history.

(56) References Cited

U.S. PATENT DOCUMENTS

| | | | |
|---|---|---|---|
| 6,788,980 B1* | 9/2004 | Johnson | G05B 19/042 700/1 |
| 7,216,013 B2* | 5/2007 | Kibbler | B07C 5/02 198/444 |
| 7,306,086 B2* | 12/2007 | Boelaars | B65G 47/53 193/35 SS |
| 7,732,726 B2* | 6/2010 | Valerio | B07C 5/344 209/552 |
| 8,170,712 B2 | 5/2012 | Battles et al. | |
| 8,457,781 B2* | 6/2013 | Bailey | B07C 3/00 700/224 |
| 8,494,672 B2* | 7/2013 | Chirnomas | B65G 1/1373 700/215 |
| 8,639,382 B1 | 1/2014 | Clark et al. | |
| 8,731,711 B1* | 5/2014 | Joplin | B21B 41/00 700/213 |
| 8,833,541 B2* | 9/2014 | Aillon | B65G 21/14 198/358 |
| 8,991,589 B2* | 3/2015 | Marcantoni | B65C 9/067 198/469.1 |
| 2012/0116572 A1* | 5/2012 | Corak | B07C 5/36 700/223 |
| 2014/0091013 A1* | 4/2014 | Streufert | B65G 47/95 209/552 |

(Continued)

OTHER PUBLICATIONS

"Selecting and Installing Conveyor Belt Scales", Shepher, et al., Ask Joe!- Archived Article, downloaded Jun. 16, 2014, pp. 1-5.
"Belt Rip Detector for Conveyor Belt Sensor Guard Veyance Technologies: Goodyear Engineered Products", Direct Industry, downloaded Jun. 16, 2014, pp. 1-14.

(Continued)

*Primary Examiner* — Gene Crawford
*Assistant Examiner* — Thomas Randazzo
(74) *Attorney, Agent, or Firm* — Robert C. Kowert; Meyertons, Hood, Kivlin, Kowert & Goetzel, P.C.

(57) ABSTRACT

Methods and devices for measuring attributes of objects such as containers and container content without opening the containers are disclosed. Measurements of containers are obtained during conveyance via conveyor. For example, a sensor, such as a pressure sensing system, may measure pressure or contact between the container and the conveyor conveying the container. The measurements may be analyzed to determine characteristics of the container such as the weight, weight distribution and/or dimensions of the container. The conveyor may be configured to jostle the container such that an inertial property of the container and/or container content may be measured and analyzed. The measurements obtained may be used to ascertain a problem or characteristic of the container and/or container content without opening the container, such as damage, packing condition, number of units, presence of liquids, and the like. The method and device may be used through a materials handling facility.

20 Claims, 10 Drawing Sheets

(56) References Cited

U.S. PATENT DOCUMENTS

| | | | |
|---|---|---|---|
| 2014/0255130 A1* | 9/2014 | Pierangelino | B65G 63/004 414/141.3 |
| 2015/0001137 A1* | 1/2015 | Layne | B07C 5/36 209/552 |

OTHER PUBLICATIONS

"Function Flange Type Load Sensor", Erhardt+Leimer Inc., downloaded Jun. 16, 2014, 1 page.

U.S. Appl. No. 14/304,557, filed Jun. 13, 2014, Pragyana K. Mishra.

* cited by examiner

SENSING CONVEYOR FOR OBJECT CHARACTERISTIC DETERMINATION

BACKGROUND

Materials handling facilities move materials, such as objects via various conveyance mediums or mechanisms such as carts, conveyors, lifts, trucks and the like. Conveyance mediums or mechanisms may be used to move materials into, out of and within the facility. For example, materials may be unloaded from trucks at a receiving area into the facility, conveyed among various processing stations or storage areas within the facility and conveyed out of the facility at a shipping area. In some materials handling facilities, received materials, such as objects or components, may be manufactured into other materials and objects, such as retail items. Some facilities may send out the same items that they receive, for example, fulfillment centers.

Materials, such as objects or items may be processed at processing stations in a facility. Conveyance mediums or mechanisms may transport the materials to or from a processing station. Sometimes, a processing station may be configured as part of a conveyance mechanism, for example, labels may be applied to packages as the packages are transported on a conveyance mechanism.

In some materials handling facilities, packages or containers containing items may be received and packages or containers containing items may be shipped. In some facilities, items may be unpacked, stored, repackaged and shipped. For example, agents of a distribution center may unpack received items packaged in a large quantity to repackage them for sale in smaller quantities or the distribution center may unpack items to determine if the item is broken or damaged during shipment before repackaging the item and shipping the item. Sometimes, the destination of a received item or package within a facility is unknown until characteristics of the item or package are determined by unpacking the item. In some facilities, the destination of a package may change when it is determined that an item in the package has a characteristic that is unexpected, for example, if the package weighs more than it should, if the package is damaged, if an item within the package is damaged, if the package is poorly packed, or if the package has liquid contents, etc.

Figure 1:
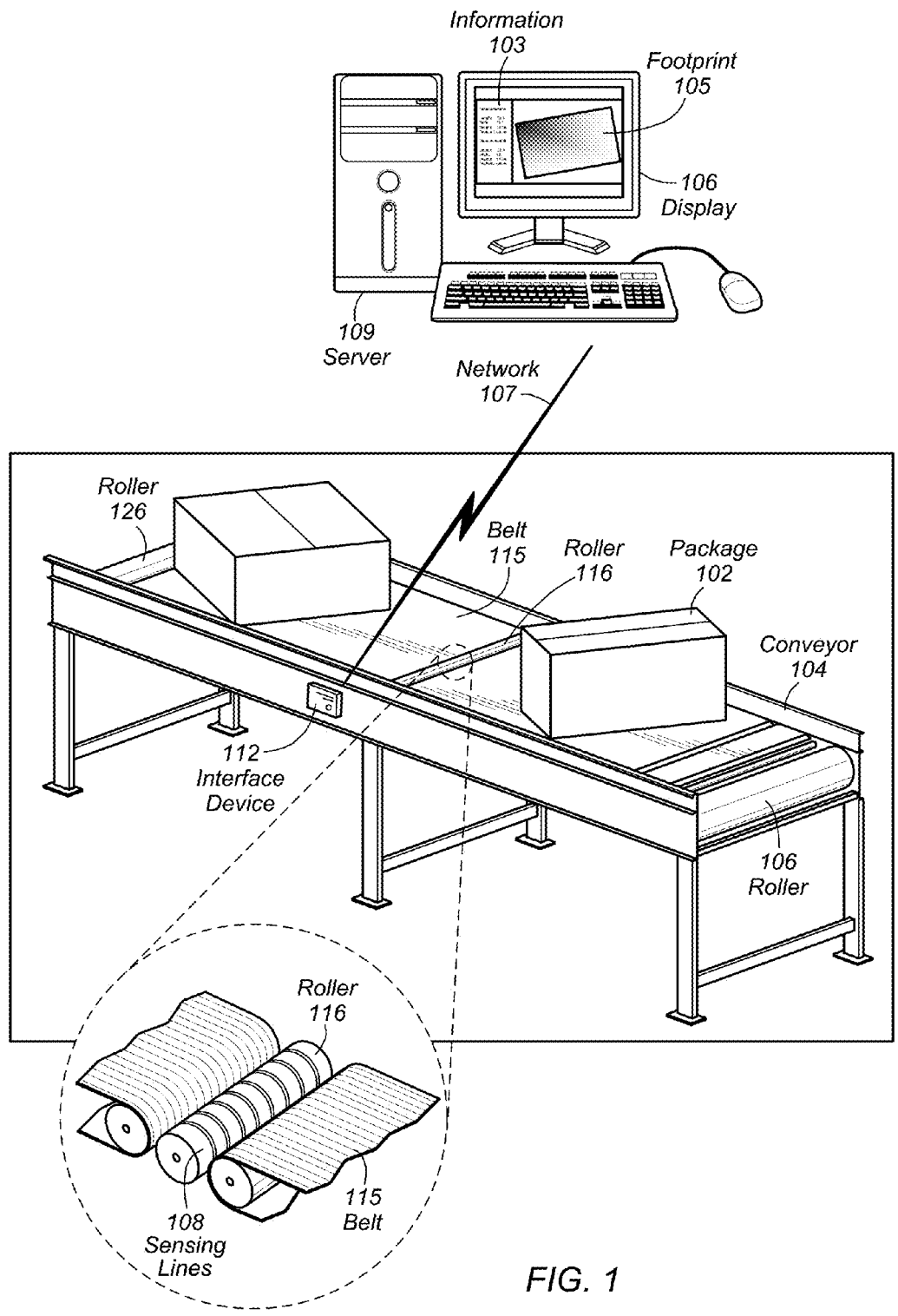
FIG. 1 illustrates a conveyance system according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a device, system and methods for determining characteristics of conveyed materials such as one or more objects are disclosed. In some embodiments, characteristics of items within objects, such as items within a container may be determined. In some embodiments, characteristics of the content of objects may be determined without opening the object.

For example, a conveyance mechanism (conveyance medium or conveyance mechanism may be used interchangeably throughout this disclosure, unless otherwise specified; in some embodiments, a conveyance mechanism may comprise one or more conveyance mediums, such as a belt or surface of a roller or a shelf, for example) may be configured with a sensing element, component, mechanism, or device, etc., capable of measuring physical attributes of objects as the objects are conveyed (e.g., sensing contact or pressure between the conveyance mechanism and the object conveyed via the conveyance mechanism). Measurements of the attributes may be obtained and analyzed to determine characteristics of the objects. For example, if the measurements obtained generally indicate a rectangular shape, the object associated with the measurements may be given the determined characteristic of a container.

In some embodiments, a footprint of the object may be obtained. For example, an array of sensors of the conveyance system may determine that portions of a footprint of the object are associated with a higher pressure than other portions of the object's footprint. In some embodiments, an object exhibiting a footprint with higher pressure in one portion of the footprint may have been packed incorrectly. As such, a footprint of an object that indicates uneven pressure may be used to determine a characteristic of the item inside the container, e.g., that the item inside the object is packed incorrectly.

In some embodiments, the movement associated with conveyance of an object via the conveyance system may be used to learn characteristics (e.g., the inertial properties) of the object. For example, a conveyor system may be directed to change a speed or direction of conveyance such that the footprint of the object conveyed by the conveyance system exhibits measurable changes. For example, a control system may send instructions to a conveyor device directing the conveyor device to operate such that the conveyed object is moved back and forth. In embodiments, the sensors may measure or sense the response or reaction of the object to the instructed movement. In another example, the natural vibration or routing of the conveyance system may be sufficient. In one example, rollers in an offset configuration may jostle the object to cause a change in speed or direction of the object, while in another example, a conveyor belt may be directed to change velocity such that the conveyed object's footprint exhibits a change in weight distribution, as measured by the sensors of the conveyor system. In yet another example, movable shelves that may be lifted and transported by mobile robots, transport automation such as powered industrial trucks, or drive units may be directed to convey items on the shelves from one place to another within the facility. The robots may be directed to change velocity, similar in manner to how the conveyor belt is instructed to change velocity, for example. Various other forms of movement, such as vibrating, shaking or oscillating may be induced on the objects through various other mechanisms or processes, in embodiments.

The change in weight distribution may be measured by the sensors of the conveyance system and used to determine characteristics (e.g., a weight distribution or inertial properties) of the object and/or items in the object. For example, when an object such as a container of liquids changes velocity or direction, the change may cause the liquid to oscillate, even after the container has returned to a constant speed. Such oscillations may be measured by the sensors, as described herein. Analysis of the measurements may be used to determine that the contents of the container are liquid without opening the container that the liquids are in. In some embodiments, analysis of measurements associated with an object may determine movement within the object, when a fragile item has been broken, for example.

The prior examples are just some of many ways that measurement of various measurable attributes (e.g., static or dynamic attributes) of objects such as length, width, weight, and/or weight distribution across a footprint of the object (e.g., measured over time) can be used to determine characteristics of objects, such as an object's inertial properties related to the object's momentum. The determined characteristics may be used to determine a process in a materials handling facility for the object, such as detecting liquid, gel, or semisolid contents of a shipping container without opening the shipping container and routing the object to an area of the facility configured for such objects. Other uses may include ascertaining poorly-packaged or damaged contents of objects such as containers for example, although many other benefits, such as the combination of conveyance and weight determination at the same time will also become apparent.

An attribute-sensing conveyor system for determining characteristics of objects conveyed via the conveyor system is illustrated in FIG. 1, in accordance with various embodiments. The conveyance system is depicted with a conveyor that includes a conveyor frame 104, rollers 106, 116 and 126, and belt 115 for conveying objects such as package 102. Detail of roller 116 is depicted with sensing lines 108 on roller 116 that is disposed between belt 115 and another belt.

In some embodiments, a conveyor system may be configured with sensors, such as sensing lines 108 of roller 116, that may measure one or more attributes of an object as the object is conveyed on the conveyor. The conveyor system may be configured such that measurements obtained by the sensors are sent to a control system (e.g., server 109). An interface, such as interface device 112 may be configured as a communication component of the conveyor system that sends the measurements from the conveyor to the control system (e.g., via network 107).

In embodiments, such as the one depicted, the control system may receive the measurements, analyze the measurements and determine characteristics of the object based on the measurements. For example, as illustrated in FIG. 1, a display controllable by the control system may be instructed to display a footprint of the object. The footprint may have been measured or calculated based on the measurements from the sensors. As illustrated, in some embodiments, the footprint (e.g., footprint 105) may depict a weight distribution as well as dimensions of the object. In the depicted embodiment, measurements and characteristics (e.g., information 103) of the object are displayed as well. In some embodiments, a user may instruct a process for the object based on the displayed footprint or characteristics, via the user interface of the display, for example.

Sensors

Figure 2:
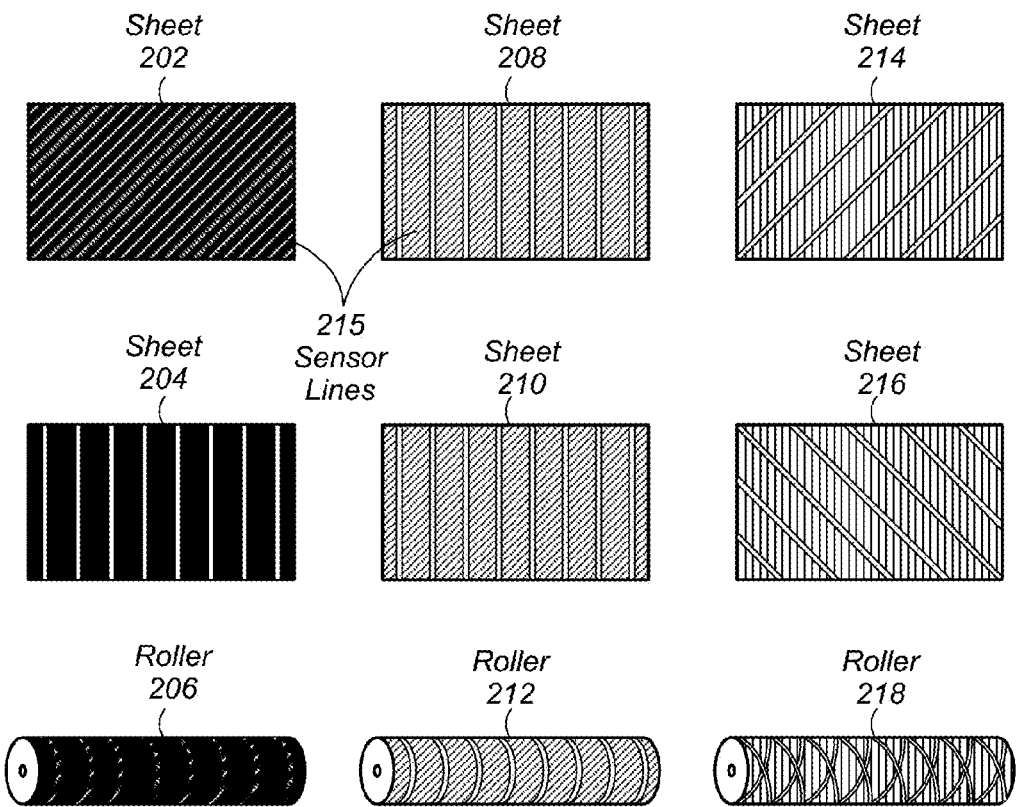
FIG. 2 illustrates various sheets and rollers of a conveyance system, in some embodiments.

Various sensor components may be used to form one or more sensors for sensing the pressure or contact between the conveyor system and the materials being conveyed by the conveyor system. In some embodiments, various components (e.g., sheets of sensor material) may be used to form an array of sensors. FIG. 2 illustrates various types of sheets of sensor material and components of a conveyance system, in some embodiments. In FIG. 2, various individual sheets are illustrated that may be used as layers of a sensing medium (e.g., the sensing roller illustrated in FIG. 3). Sheets 202, 204, 208, 210, 214 and 216 each illustrate examples of sheets of sensor material that may be used as electrodes. Electrodes may be combined as pairs of one transmit electrode and one receive electrode, although other organizations and arrangements of electrodes are contemplated. Any of the example electrodes may be used as transmit or receive electrodes. For example, sheets 202 and 204 may be combined into layers to form multiple layers on roller 206 as illustrated in FIG. 2. In the combination, either sheet 202 or sheet 204 may act as a transmit electrode. Similarly, sheets 208 and 210 may be combined to form multiple layers on roller 212, and sheets 214 and 216 are illustrated in the layers of roller 218. Other patterns and arrangements used in the formation of sensors are contemplated; sheets may comprise grids of sensors, for example.

In some embodiments, the pattern or arrangement of sensors may be dependent upon the sampling resolution of the footprint and the shape of the footprints traversing over the sensor surface (e.g., the pattern or arrangement may be based on the most-frequent shape). Various different patterns and arrangements of sensors may provide more or less precise measurements of the pressure or contact measured. For example, the sheets illustrated in FIG. 2 are illustrated with sensor lines 215. In some embodiments, sensor lines 215 correspond with an array of sensors. For example, the sensor lines of sheet 204 are arranged in parallel lines vertically across the sheet 204. In some embodiments, each one of the parallel lines of the sheet 204 corresponds with a separate sensor of a sensor array. In some embodiments, each one of the parallel lines of the sheet 204 may correspond with multiple sensors, placed end-to-end to form an array. The spacing between the sensor lines may be altered in various embodiments. For example, arranging the sensor lines closer together such that more sensor lines exist in a given area of the sheet may provide for more accurate measurements than when fewer sensor lines are used. As illustrated in 206, 212 and 218, sheets with sensor lines oriented in the same or different alignment may be combined in layers on a roller. Accuracy may be increased in various ways. For example, various statistical methods (e.g., interpolation), learned priors, or machine learning techniques may be used in the analysis of the measurements. In some embodiments, statistical methods may be used, instead of or in addition to additional sensor lines to increase the accuracy of the measurements.

Any of various components of a conveyance system may be configured with sensors that sense and/or measure (e.g., via pressure or contact) physical characteristics (e.g., weight and/or dimensions) of objects conveyed via the conveyance system. In some embodiments, conveyance mechanisms may include one or more conveyance mediums such as the surface of a roller or a belt of a conveyor or a shelf of movable shelving. Conveyance mediums may be driven or controlled by other portions of the conveyance mechanism, in embodiments. For example, a belt conveyor medium may be driven by a motor that drives the belt via various gears or pulleys or rollers and the like and may be supported by various other portions of the conveyance mechanism, such as rollers or the belt support illustrated in FIG. 4A.

In another example, the surface of a roller conveyor medium may be coupled to other portions of the roller, such as bearings between the roller surface and the rest of the conveyor system or mechanism. A roller-based conveyance system may include a drive mechanism for driving the roller at a velocity, in embodiments. Some roller-type conveyance systems may include load sensors connected between the axis of the roller and the frame of the conveyor, such that measurements of weight may be obtained. Instead of such axis-load sensors, some embodiments described herein may use surface-based sensors to obtain various measurements. In some embodiments, axis-load-based sensors may not be able to obtain the same level of granularity or precision as the surface-based sensors described herein, for example when measuring the footprint of an object. For example, an axis-load-based sensor system may be limited to the number and type of sensors (e.g., one weight-based sensor at each end of the roller) per roller. Additionally, some axis-load-based sensor systems may be unable to sense or measure dimensions of an object, such as length or width, for example.

Figure 3:
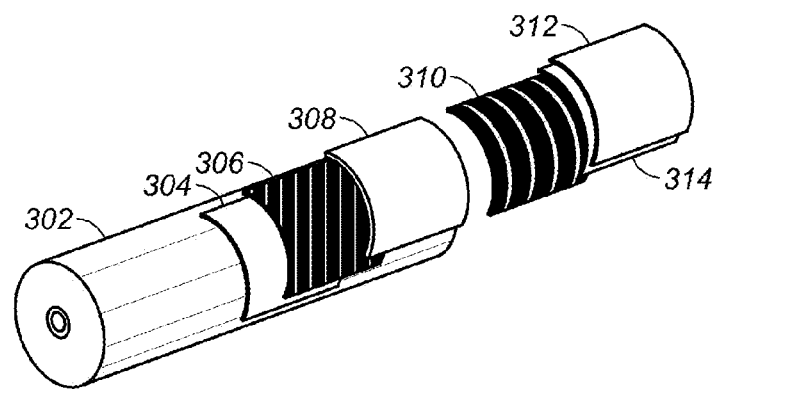
FIG. 3 is an exploded view of a component of a conveyance system, according to some embodiments.

FIG. 3 is an exploded view of a component of a conveyance system, according to some embodiments. FIG. 3 illustrates a pressure-sensing conveyor roller in accordance with various embodiments described herein. A roller may be configured of, or with, any sensor that measures attributes of objects conveyed via the conveyance system. In some embodiments, pressure sensitive sensors may be used, although other types of sensors are also contemplated. Some example pressure sensing technologies include resistive, capacitive, infrared, optical, and the like. Some systems may comprise a force-per-area-based measurement system.

In the illustrated embodiment, roller base 302 serves as a base upon which one or more sensors may be built, such as a capacitive-based sensor, for example. In some embodiments, the roller base itself may be made of sensing material. In other embodiments, one or more layers of sensor material such a sensor sheet, substrate, dielectric, bonding substrate or protective material may be applied to the roller base. The number of layers and the order of the layers may vary, in embodiments.

In the illustrated embodiment, a substrate 304 is added to roller base 302. Any of various substrates may be used. Thermoplastic polymer resin is one particular example, although other substrates may be used, in embodiments. In the illustrated embodiment, electrode 306 is added as a layer in addition to the substrate 304. Electrode 306 may be made of any of various sensor materials and configurations (e.g., sheets/configurations 202-218). In some embodiments, electrode 306 may be a driving electrode layer, while in some embodiments electrode 306 may be a receiving electrode layer. In some embodiments, electrode 306 may be connected to a controller and/or transmission device (e.g., a capacitance-to-digital conversion controller and/or interface device 112 of FIG. 1).

FIG. 3 illustrates a separator layer 308 in between electrode 306 and electrode 310. In some embodiments, separator layer 308 may be formed of a dielectric (e.g., polyurethane or foam such as silicone foam). Electrode 310 may be made of any of various materials (e.g., sheets 202, 204, 208, 210, 214 and 216). In some embodiments, electrode 310 may be a driving electrode layer while in other embodiments electrode 306 may be a receiving electrode layer. In some embodiments, the sensing electrode may be configured closer to the roller than the driving electrode or vice versa. In some embodiments, electrode 310 may be connected to a controller and/or transmission device (e.g., controller/interface 112 of FIG. 1). The controller and/or transmission device may continuously obtain measurements from the sensors or may obtain measurements periodically or aperiodically, in embodiments. The controller and/or transmission device may continuously send the measurements to the control system or may send the measurements periodically or aperiodically, in embodiments.

Bonding substrate 314 is illustrated as covering electrode 310. The illustrated bonding substrate may be made of any material; some examples include polycarbonate, thermoplastic polymer resin or the like, in embodiments. Protective layer 312 is illustrated and may be formed of various protective materials, in embodiments.

Figure 4A:
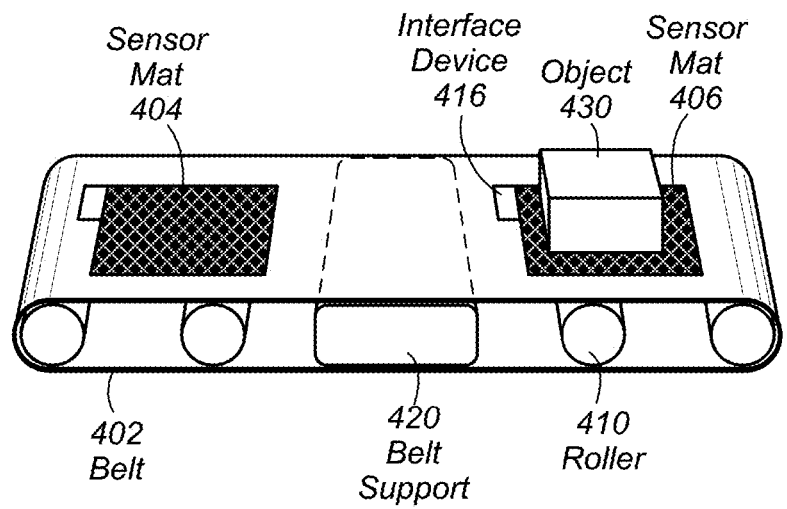
FIG. 4A illustrates a conveyance device, according to one embodiment.

The sensors of the conveyance system may be configured in any of various configurations. As illustrated in FIG. 3, the sensors may be configured as part of a roller. FIG. 4A illustrates a conveyance device, according to one embodiment, where the sensors are configured as part of a conveyor belt.

FIG. 4A illustrates a conveyance system where a conveyor belt 402 is supported by several rollers 410 and a belt support 420. In the illustrated embodiment, conveyor belt 402 is configured with sensor mats 404 and 406. In some embodiments, the sensor mats may be made of sensor sheets similar to the sensor sheets in FIG. 2. FIG. 4A illustrates that sensor mats (e.g., 404 and 406) may be coupled to an interface device (e.g., 416). In some embodiments, sensors may be embedded into the conveyor belt. Some embodiments may comprise conveyor belts without sensors embedded into the conveyor belt.

Interface device 416 may act as an interface between one or more sensors and other components of the conveyor system or materials handling facility. In some embodiments, an interface device may send (e.g., periodically or continuously) measurements or indications of measurements of the sensed pressure or contact between the conveyor belt 402 and the items (e.g., object 430) being conveyed by the conveyor belt. For example, interface device 416 may send the measurements to a control system, such as the control system 610 illustrated in FIG. 6. Interface device 416 may be configured with a wired or wireless interface for connection to other components of the conveyor system or materials handling facility. In some embodiments, interface device 416 may be configured to participate in a centralized wireless network. In some embodiments, interface device 416 may be configured to participate in an ad-hoc wireless network. The interface device 416 may be battery operated and may recharge the battery based on the kinetic energy of the conveyance system, in embodiments. The interface device 416 may transmit all of the driving electrode and sensing electrode data, in embodiments. In some embodiments, the interface device may analyze and/or consolidate the data and send a reduced amount of information to the control system. The reduced amount of information may include decisions or analysis of characteristics such as damaged, lopsided/side-heavy, or loosely-packed packages, in embodiments.

Figure 4B:
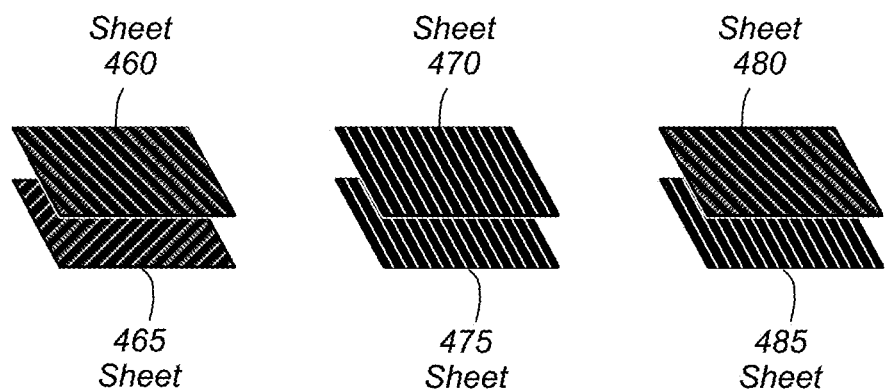
FIG. 4B illustrates sheets for use with a conveyance system, according to embodiments.

In some embodiments, the sensor mats may be made of layers of sheets in an arrangement similar to the layers illustrated in FIG. 3, albeit on the flat surface of a belt instead of wrapped around a roller. In some embodiments, the sensor mats may be arranged in a manner different from the illustrated arrangements. FIG. 4B illustrates sheets for use with a conveyance system, according to embodiments such as various example arrangements of sheets with sensor lines that may be combined to form sensors or an array of sensors. For example, sheets 460 and 465 may be combined into layers such that the diagonal sensor lines of each sheet run across diagonal sensor lines of the other sheet. Sheets 470 and 475 illustrate that sheets with straight sensor lines may be combined in layers such that sensor lines run parallel to one another. Sheets 480 and 485 illustrate another configuration where sheet 485 with straight sensor lines is combined with a sheet with diagonal sensor lines.

In some embodiments, belt support 420 may be configured to provide a consistent, flat surface such that the pressure sensing elements of the sensor mats on the belt may obtain more accurate measurements of the pressure caused by the downward force of the object on the sensor mat. In some embodiments, sensors may be configured as part of the belt support such that measurements may be obtained for objects as the objects are conveyed across the sensor-enabled belt support, without or instead of coupling sensors such as the sensor mats 404, 406 to the conveyor belt, for example.

In embodiments, the objects that are conveyed by medium such as belts and rollers move with relationship to the frame that supports the belts or rollers. Further, whereas belts and rollers (and thus the sensors the belts and rollers are configured with) move in relationship to a frame that supports the belts or rollers, portable shelves may be configured with sensors such that sensors do not move in relationship to the frame of the portable shelf. In some embodiments, portable shelves configured with sensors may obtain measurements of the movement of objects conveyed via the portable shelves as the objects are jostled during movement of the shelves. In some embodiments, mobile drive units or robots may be instructed such that the objects on the portable shelves are intentionally jostled, and the induced movements of the objects measured.

Shelves may be configured with the sensors described herein, in embodiments. For example, storage shelves, or moveable shelves (e.g., shelves moveable by robots that lift and transport the shelves) may be configured with the sensors describe herein such that attributes of the objects on the shelves may be determined in a similar manner as described herein. In embodiments, sensors may be placed between the lifting arm of the robot and the shelf being lifted and transported by the robot such that a weight of the shelf may be determined. In embodiments, the trays of the shelves may be covered with sensing sheets as described herein such that a weight distribution of the tray of the shelf may be determined. The weight distribution may be used to determine one or more materials handling facility processes such as warning that an item has fallen, or instructing the robot to orient the shelf such that there is a reduced chance of failure when the shelf is moved by the robot. Another example materials handling facility process that might be determined includes determining where to add or remove items from the shelf such that the shelf remains balanced and instructing addition or removal of the items from the shelf in accordance with the determined location on the shelf. Yet another example materials handling facility process may include a shipping or transportation process for the object, although other materials handling facility processes are contemplated as well.

In embodiments, a conveyance medium may be configured with a sensor or sensor medium such that the movement of an object conveyed via the conveyance mechanism matches the movement of the sensor or sensor material. In some embodiments, the object and the sensor may move together while both are in motion. In some embodiments, due to the object at least partially resting upon a surface of the sensor, the object and sensor are moving in substantially the same direction at substantially the same speed. As a result, the movement or motion of the object is substantially the same as the movement or motion of the sensor.

Footprints

Figure 5:
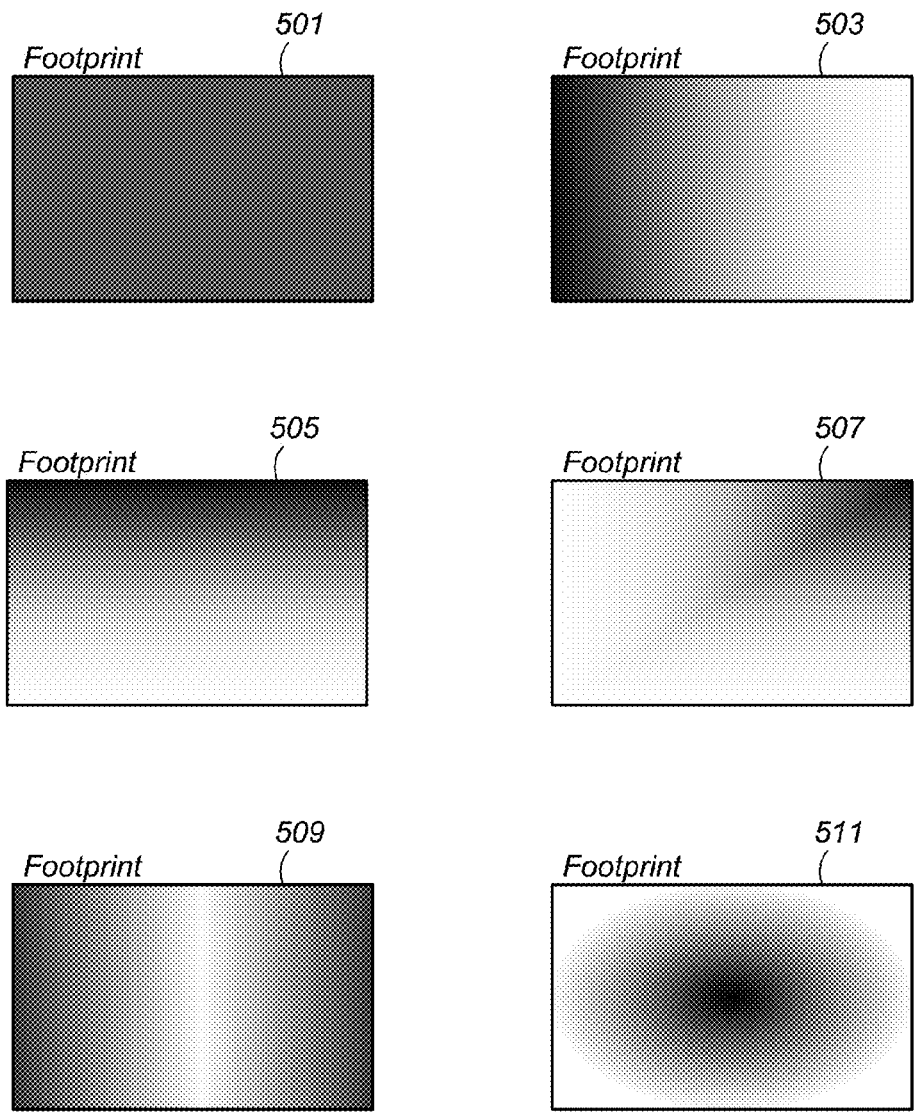
FIG. 5 illustrates footprints of objects according to some embodiments.

The measurements obtained from the objects being conveyed may be used to generate footprints of the objects. In some embodiments, the dimensions of the footprints may be analyzed, to determine if an object such as a container has been damaged or crushed for example. In embodiments, the footprint may illustrate the weight distribution measured from the object. FIG. 5 illustrates footprints of objects according to some embodiments.

FIG. 5 illustrates six different examples of footprints that illustrate the weight distribution of the object although other footprints are contemplated. In the illustrated embodiments, the darker colored portions of the footprints may be associated with heavier portions of the object and the lighter colored portions of the footprints may be associated with the lighter portions of the footprint, or vice versa. Footprint 501 illustrates a footprint for an object with an even, consistent weight distribution. Footprint 503 illustrates a footprint of an object that is heavier on one end than on the other end. Footprint 505 illustrates a footprint of an object that is heavier on one side than on the other side. Footprint 507 illustrates a footprint of an object that is heavier in one corner that at other corners. Footprint 509 illustrates a footprint of an object that is lighter in the middle than on the ends and footprint 511 illustrates a footprint of an object that is heavier in the middle than around the edges.

The various footprints illustrated may be associated with characteristics of objects, such as characteristics of containers for example. In one example, the footprint 501 may be associated with a container that is packed with items correctly. The other footprints 503-511 may be associated with containers that are incorrectly packed. For example, footprints 503 and 505 may be associated with containers that have items shifted too far to one end or one side. Footprint 507 may be associated with containers that have an item that has shifted into one corner, footprint 509 may be associated with containers that have items that have shifted to opposite ends or sides, and footprint 511 may be associated with containers that have an item that is too heavy for the container.

Template footprints that act as examples of known weight distributions may be used to select a particular materials handling facility process for the object. For example, footprints for an object may be generated based on the measurements of the attributes of the object that were obtained while the object was being conveyed. The generated footprint may be compared with template footprints (e.g., template footprints may be stored in data store 640 by calibration module 628) such as the footprints 501-511 and a match may be determined based upon the comparison. A rule (e.g., from a set of rules stored in data store 640 by calibration module 628)

associated with the matched footprint template may be applied in the selection of the particular materials handling facility process. For example, if the generated footprint for the object is matched to footprint 501, an instruction to send the object to a labeling process prior to shipment may be sent. In another example, if the generated footprint from the object is matched to footprints 503-509, an instruction to have the object directed to an inspection station may be sent. In yet another example, if the generated footprint from the object is matched to footprint 511, an instruction to have the object directed to a repackaging area may be sent.

Objects may exhibit changing weight distributions. For example, liquids or loose mass within an object may shift forward when an object slows or is stopped. The shift may create a recognizable signature or be otherwise measured such that presence of a liquid or loose item(s) within the object is detected without opening the object. For example, when the mass moves forward, more pressure or weight may be measured at the front of the object as the weight distribution changes with the shift.

In some embodiments, irregular footprints may be detected. Irregular footprints may indicate a damaged object. For example, a damaged object, such as a damaged container may exhibit an irregularly-shaped footprint other than the expected rectangular footprint (e.g., if a corner of the container was caved in). Recognition of irregular or unexpected footprints may be used to identify damaged or unexpected objects and/or damaged or unexpected items within the objects, in embodiments. The identification may be used to route the objects, accordingly.

Control System

Figure 6:
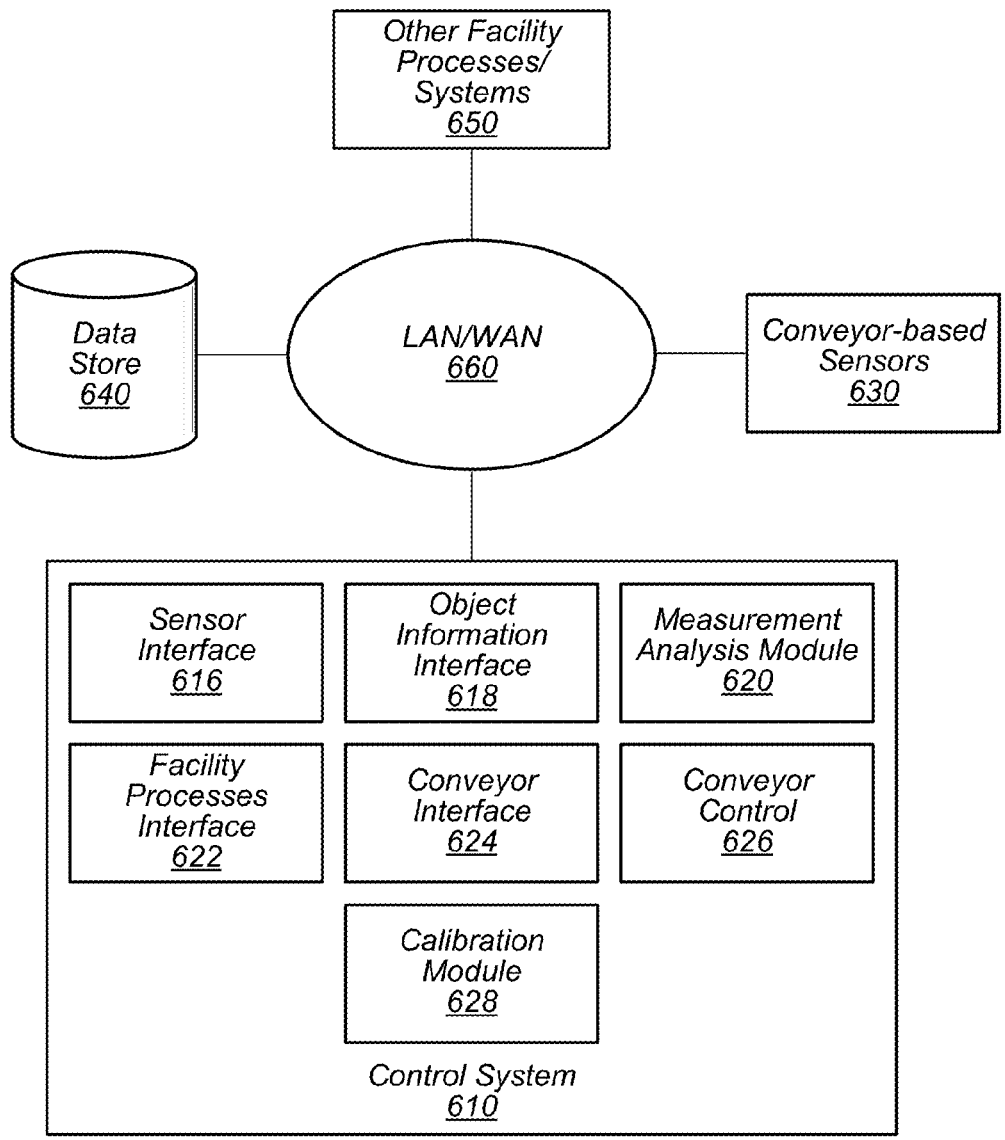
FIG. 6 illustrates a control system of a materials handling facility, according to some embodiments.

The systems, processes and devices described herein may be controlled, directed or instructed, for example by a control system. The control system may instruct various components of the materials handling facility or of the conveyor system to perform actions or processes described herein, such as the processes illustrated in FIGS. 7 and 8. FIG. 6 illustrates a control system of a materials handling facility, according to some embodiments. The control system may direct the processes described herein, in embodiments. The control system 610 is illustrated with connections via LAN/WAN network 660 to datastore 640, other facility processing systems 650 and conveyor-based sensors 630.

In FIG. 6, various modules 616-628 of control system 610 are illustrated as part of control system 610. In various other embodiments, the various components may be arranged otherwise. For example, some or all of modules 616-628 may be part of other components or other applications. One, some or all of the modules 616-628 may be implemented entirely or partially on a single device or across multiple devices. For example, measurement analysis module 620 may be implemented wholly or partially on one or more servers while calibration module 628 may be implemented wholly or partially on interface device 112 or 416. All portions of the control system 610 may be implemented in various different ways and across various different devices including portable and non-portable communication devices, servers, displays, etc. These devices may include various components such as those illustrated in FIG. 11, described below.

As illustrated in FIG. 6, control system 610 may include conveyor control 626, conveyor interface 624 and facility process interface 622. Facility process interface 622 may act as an interface between conveyor control 626 and other facility processes/systems 650. For example, conveyor control 626 may receive instructions from an order fulfillment process via facility process interface 622. The instructions may indicate that one or more objects, such as items or packed orders, are to be fulfilled. Conveyor control 626 may respond to the instructions by directing objects such as items and packages containing items to be conveyed to various areas or stations within the facility, for example. The instructions may be sent to various components of the conveyor system, for example via conveyor interface 624, acting as an interface between the conveyor control module 626 and the conveyor systems, which may be part of other facility processes/systems 650, in some embodiments. Conveyor control may rely upon data stored in one or more data stores (e.g., data store 640) for example, to determine the location of objects such as items or containers of items that are to be conveyed.

Sensor interface 616 may act as an interface between the various components of the control system 610 and conveyor-based sensors 630. For example, the conveyor based sensors, as described herein, may receive instructions via and/or transmit measurements of physical attributes of objects via a device interface (e.g., interface device 112 of FIG. 1 or interface device 416 of FIG. 4B). The instructions may be sent from and measurements or indications of measurements may be communicated though sensor interface 616, acting as an interface between the sensors and the components of the control system 610. The sensor interface 616 may store the obtained measurements (e.g., in data store 640) or provide the obtained measurements for measurement analysis module 620, in embodiments.

Measurement analysis module 620 may be configured to analyze the measurements obtained from the conveyor-based sensors 630. In some embodiments, the measurement analysis module may obtain the measurements from the data store 640 or from sensor interface 616. Measurement analysis module 620 may determine any of various characteristics of the object that the physical attributes are measured from, based on the measurements. For example, the measurement analysis module 620 may determine the weight, weight distribution, footprint, change in weight distribution or footprint or inertial properties of the object based on the obtained measurements. Other characteristics may be analyzed and determined as well. The characteristics may be stored (e.g., in data store 640) and/or used to select a particular process for the object.

Object information interface 618 may act as an interface between various components of the control system 610 and stored information about the objects. For example, object interface may act as an interface between measurement analysis module 620 and product or container information stored in data store 640 or other data store (e.g., as part of other facility processes/systems 650). In some embodiments, measurement analysis module may obtain information about an object, such as a container, item or product to determine whether the measurements and/or determined characteristics of the object match the stored information for the object. For example, the measurement analysis module 620 may obtain the measured weight of the item and compare it to the expected weight of the item. In some embodiments, such analysis may be used to audit or verify objects or processes within the facility. In some embodiments, the measurement analysis module 620 may store information about the object via materials information interface (e.g., to data store 640 via object information interface 618).

In some embodiments, various components of the control system 610 may communicate with other facility processes/systems 650 via facility processes interface 622. For example, conveyor control 626 may communicate back and forth with an order fulfillment system regarding the progress of an order being fulfilled. In another example, conveyor control 626 may communicate with a manufacturing processing control system regarding the status of an object in a manufacturing process.

In embodiments, a calibration module (e.g., calibration module 628) may be configured to perform calibration processes to calibrate the sensors or to calibrate algorithms that operate on data from the sensors. The calibration module 628 may be configured to use various machine learning techniques to calibrate. For example, the calibration module may obtain multiple signatures from multiple instances of the same type of object passing over the sensors and associate those signatures with the particular object that made the signatures, based on statistical analysis, in some embodiments.

In some embodiments, signatures may be measurements or characteristics determined from the measurements that are particular to the object or illustrative of particular characteristics of objects. In some embodiments, a signature may be determined based on the changes to the weight distribution of the footprint of the object as the object is jostled. For example, the calibration module may be provided object information (e.g., object type or a product code) for the particular object associated with the measured information received from the sensors such that the measured information may be associated with that type of object generally. Over time, a library of measurements or characteristics determined from analysis of the measurements for that type of object may be obtained and stored (e.g., in a database or in data store 640).

Various machine learning techniques may be applied to the stored information to determine a particular signature that is expected for that particular object. A comparison of the expected signature (e.g., an expected signature can be learned or statistically computed from a single or multiple prior signatures of a known object, in embodiments) with the actual signature for an instance of the object may be performed in order to determine whether a particular materials handling process is to be associated with the instance of the object. In some embodiments, once signatures have been established for one or more particular objects or object types, the signatures may be used to identify objects or types of objects based on the object's observed or measured signature.

In some embodiments, the calibration module 628 may be used to calibrate particular components of the conveyor system. For example, in embodiments where a single roller is used to obtain measurements of the physical characteristics of objects, an object may rest partially on the roller and partially on another part of the conveyor system while the measurements are obtained. Such an arrangement may rely upon calibration for the system to be able to determine the weight of the object. For example, an object with known physical attributes may be measured by the single roller configuration and the system may be calibrated based on the obtained measurements of the known object such that a correct weight may be determined from the measurements.

Physical characteristics of objects may be obtained and/or compared in various other ways. For example, in some embodiments, calibration may be performed otherwise or may not be necessary at all, such as when comparisons may be made based on relative, instead of absolute measurements.

Figure 7:
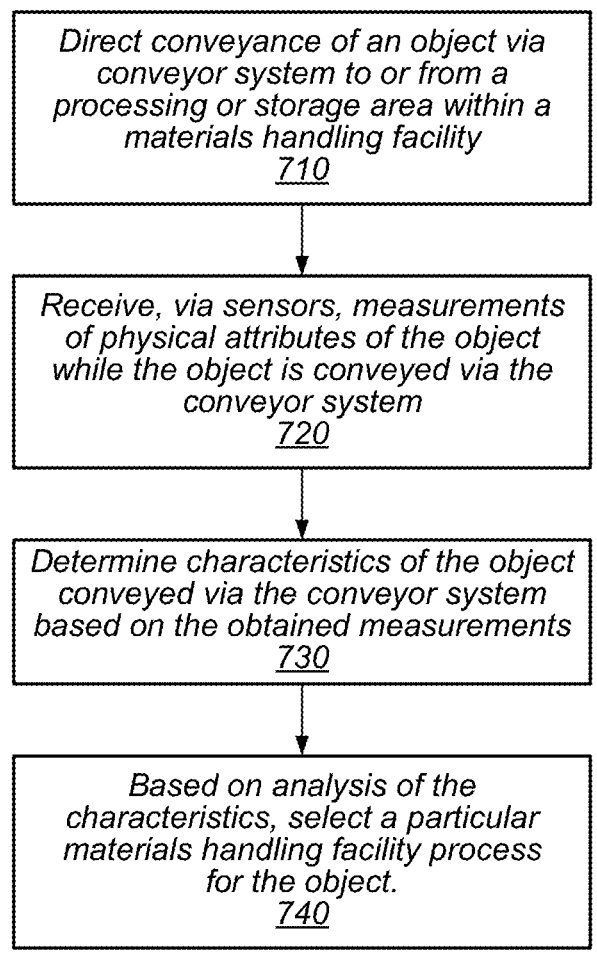
FIG. 7 illustrates a flow diagram of a process for determining characteristics of materials conveyed via a conveyance system, according to embodiments.

Various processes may be carried out in a materials handling facility and conveyance systems may be used to move objects to or from different areas where the processes are performed. In some embodiments, processes may be performed while objects are being moved. FIG. 7 illustrates a flow diagram of a process for determining characteristics of materials conveyed via a conveyance system, according to embodiments. In some embodiments, the process illustrated in FIG. 7 may be performed by one or more components illustrated in FIG. 6, such as the control system 610 or modules of the control system 610.

As illustrated in FIG. 7, conveyance of an object via conveyor system to or from a processing or storage area within a materials handling facility is directed (block 710). For example, conveyor control 626 may instruct the conveyor system to convey an object to an inventory or processing station within the facility. Measurements of physical attributes of the object may be received via sensors while the object is conveyed via the conveyor system (block 720). For example, sensors, such as sensors on rollers (FIGS. 2-3), conveyors (FIGS. 4A, 4B) or shelves of the conveyance system may be configured to obtain measurements such as weight, weight distribution, length and width and to send those measurements to the control system 610.

Characteristics of the object conveyed via the conveyor system may be determined, based on the measurements (block 730). For example, the measurement analysis module 620 may determine a weight distribution and/or inertial properties of the object from the measurements. The characteristics determined from the measurements may be compared with stored information about the object, in embodiments. In some embodiments, the characteristics of the object may be used to identify the object or what is inside the object without opening the object.

A particular materials handling process may be selected based on analysis of the determined characteristics of the object (block 740). Any of various processes within a facility may be selected for the object based on analysis of the characteristics, such as a receiving process, stowing process, sorting process, auditing process, packing process, shipping process or manufacturing process, for example. For example, if the object is determined to have a different weight than expected, an object review process may be associated with the object. In another example, if a weight is unknown for the object, the measured weight may be sent for association with the object and storage in a data store, (e.g., data store 640) as part of an object information gathering process. In yet another embodiment, a notification or warning process may be selected, based on analysis of the characteristics.

Figure 8:
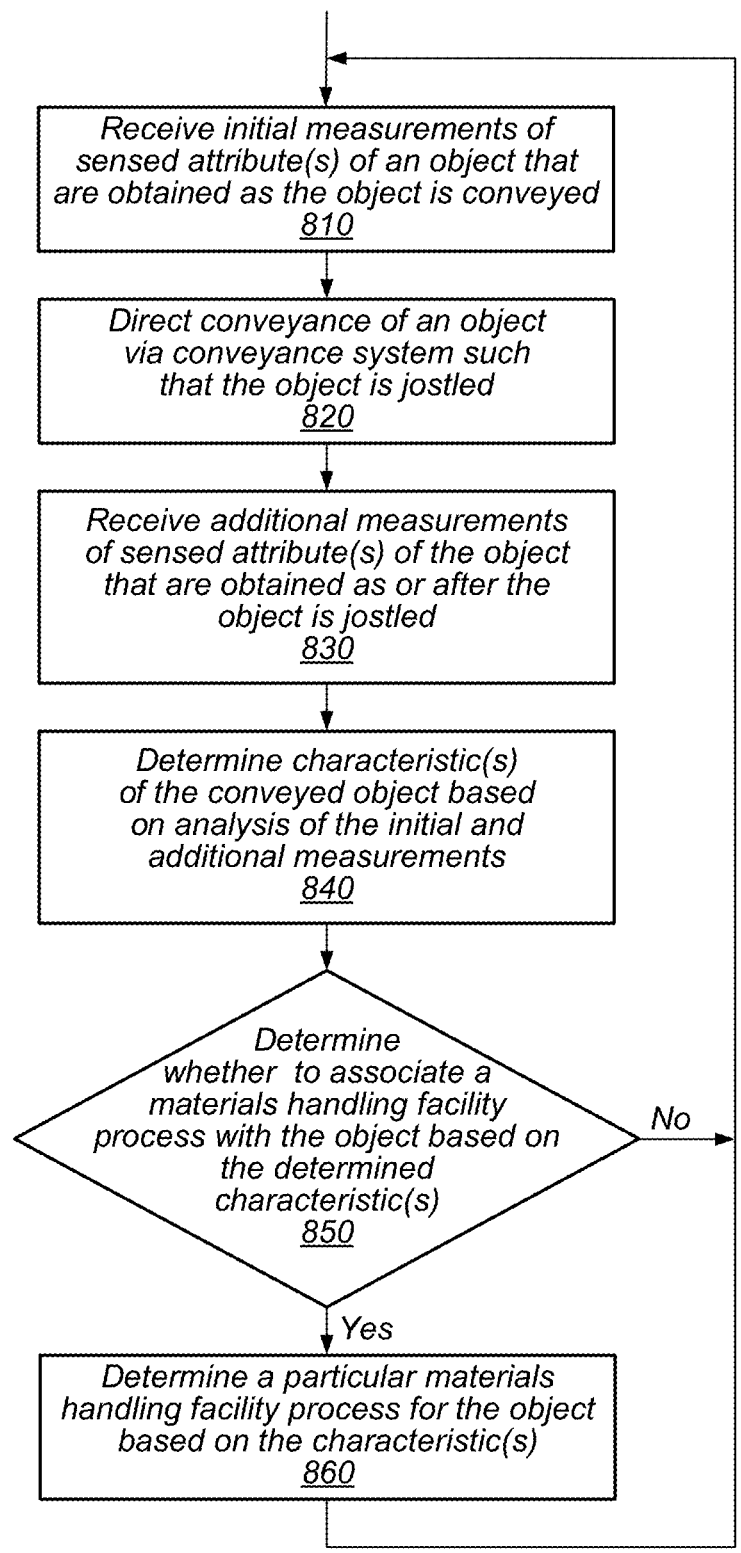
FIG. 8 illustrates a process for determining an inertial property of an object conveyed via a conveyor, according to some embodiment.

Conveyance systems generally move objects from one place to another. Objects in motion may exhibit attributes particular to or based upon the motion or change in motion. The attributes of an object, item, or item within an object may change when the object or item is set in motion, changes velocity, or changes direction. FIG. 8 illustrates a process for determining characteristics of an object conveyed via a conveyor, according to some embodiments. In some embodiments, one or more inertial properties of an object may be calculated based on attributes of the object that are measured while the object is being moved by the conveyor.

As illustrated in FIG. 8, initial measurements of sensed attributes of an object are obtained as the object is conveyed (block 810). For example, one or more sensors may measure physical attributes of objects as the objects are conveyed and may send the measurements, or indications of the measurements to a control system (e.g., control system 610). Conveyance of the object may be directed via the conveyance system such that the object is jostled (block 820). Any of various mechanisms or processes may be implemented to jostle the object. A non-exhaustive list of examples includes mechanisms that cause an object to tumble or be jostled during conveyance such as misaligned rollers or a larger size roller among smaller rollers (e.g., FIGS. 9A, 9B), or configuring the conveyor to change direction by bending left or right, up or down, etc., or directing the velocity of the conveyor or roller to change (e.g., start, stop, increase or decrease) such that the velocity of objects conveyed also change. In one example, a robot transporting a moveable storage shelf may jostle the objects on the shelf by stopping, starting, lifting, rotating or otherwise changing velocity or direction of travel.

Jostling may be active or passive. In some embodiments, active jostling indicates that that some process or mechanism may be used to induce the jostling. In some embodiments, passive jostling, such as the innate mechanical movement of conveyance mechanisms may induce jostling without an added process or mechanism.

In some embodiments, the sensors may measure a weight distribution. For example, the sensors may measure the weight distribution across a footprint of the object as the weight distribution changes during the jostling of the object. In some embodiments, multiple attributes of the object may be obtained at the same time. For example, the sensor or sensor array may obtain measurements of the weight, length and width of an object altogether.

Additional measurements of the sensed attributes of the object that are obtained as or after the object is jostled may be received (block 830). In some embodiments, the measurements from the sensors may be continually obtained and transmitted to the control system. In some embodiments, snapshots of the measurements may be obtained at points in time. In either case, effects on the measurements of the attributes of the object, such as a change in the weight distribution, while or after the object is jostled, may be measured and sent to the control system. For example, an object, such as a container, that is filled with liquids may continue to oscillate after being jostled, such that the weight distribution of the footprint continues to change after the jostling. In another example, the weight distribution of a container with a broken item may shift as the pieces of the broken item shift due to the jostling.

Characteristics of the conveyed object may be determined based on analysis of the initial and additional measurements (block 840). For example, the measurement analysis module 620 or other component of the control system may monitor the measurements of the object and recognize a change in the weight distribution during or subsequent to the jostling. If the weight distribution continuously fluctuates after the jostling, the object may be determined to have the characteristics of a fluid, for example. If the weight distribution of the object changes and then remains static after the jostling, the object may be determined as poorly packed or as containing a broken item, for example. Other characteristics may be determined based an analysis of the measurements.

A determination of whether to associate a materials handling process with the object based on the determined characteristics may be made (block 850). For example, the measurement analysis module 620 or other component of the control system 610 may apply one or more rules stored in a rules data store (e.g., data store 640) to determine whether to associate a process with the object. In one embodiment, the object may be associated with a process if the object is determined to be damaged, for example. In another embodiment, the object may be associated with a process if the object is determined to be poorly packed, for example.

If the object is not associated with a process, the process may return to block 810, where measurements of attributes of another object may be obtained and the process may repeat. If a materials handling process is to be associated with the object, a particular materials handling process may be determined for the object based on the characteristics (block 860) and the process may return to block 810, where measurements of attributes of another object may be obtained and the process may repeat. In some examples, a notification or warning process may be associated with the object, based on recognition of damage for example. In other examples, a particular manufacturing process, shipping process or fulfillment process may be associated with the object. In some embodiments, any process within the facility may be associated with the object based on the characteristics.

Roller-Based Configurations

Figure 9A:
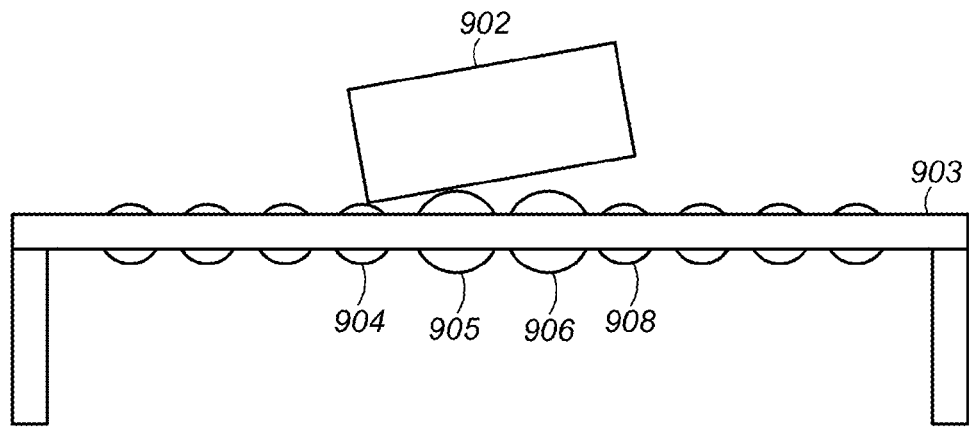
FIGS. 9A and 9B illustrate a conveyance system, according to embodiments.
Figure 9B:
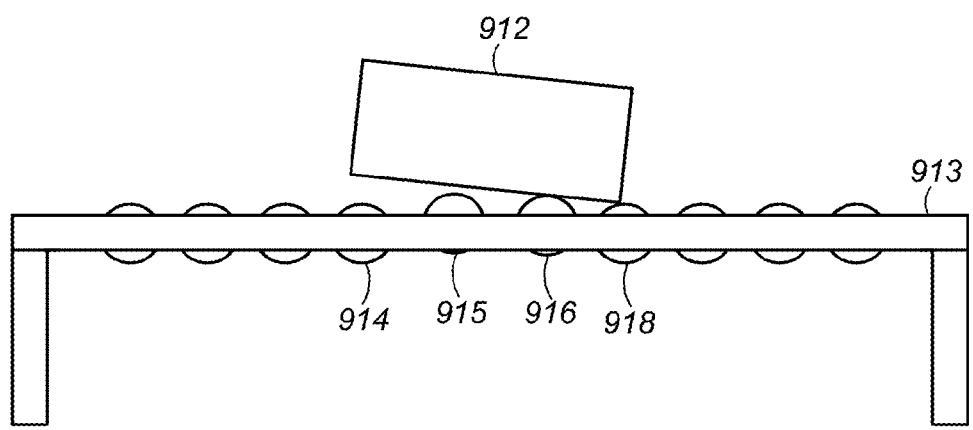

As described above, example conveyance mechanisms may include roller-based conveyance mechanisms or belt-based conveyance mechanisms. Conveyance mechanisms may be configured in various arrangements. FIGS. 9A and 9B illustrate a conveyance system, according to embodiments, where rollers are variously configured.

In contrast to some embodiments of belt-based conveyors that may include sensor mats that may sample or measure the footprint and weight distribution of an object at once, roller-based conveyors may take multiple measurements of the same object as the object rolls over the roller. For example, the sensor(s) of rollers with one or more sensors such as the rollers illustrated in FIGS. 1-3 may take multiple measurements of the same object and the measurements may be combined to create a complete footprint of the object. The weight distribution of the object may be measured in a similar fashion.

In some embodiments, the circumference and/or speed of the roller may be used in calculations to determine a dimension of the object. For example, if it is known that the roller is actuating at a rate of 6 inches per second and the object was contacting the roller for 3 seconds, then one dimension of the footprint of the object may be determined as 18 inches. In another example, if the roller is known to be 5 inches in circumference and the sensors of the roller indicate the object was in contact with the roller for 4 rotations, one dimension of the footprint of the object may be determined as 20 inches.

In some embodiments, pressure-sensing roller(s) may be used to determine the weight and/or the weight distribution of the object. In embodiments, such as embodiments where a single pressure-sensing roller is used, a calibration process may be performed to calibrate the sensor(s) and/or the weight determination algorithm used by a measurement analysis module such that the weight of an object may be determined, even though some of the weight is being supported by something other than the single pressure-sensing roller.

In the illustrated embodiments (FIGS. 9A and 9B), a conveyance system is illustrated with two pressure-sensing rollers that are configured out-of-alignment with the rest of the rollers of the conveyance system. In FIG. 9A, rollers 905 and 906 of conveyance system 903 are illustrated at being larger in diameter than the other rollers (e.g., rollers 904 and 908). In FIG. 9B, two pressure-sensing rollers (915 and 916) are illustrated as the same size as the other rollers (e.g., 914, 918) but are raised above the other rollers, in a different alignment from the other rollers.

In either embodiment, the object (902, 912) that is supported by the out-of-alignment rollers may, at some point in time, be supported solely by the two pressure-sensing rollers. In such embodiments, calibration may not be needed to determine the weight of the object or the extent of calibration may be lessened due to the additional pressure-sensing rollers. Various other embodiments may include more, fewer, or a different arrangement of the pressure sensing rollers. For example, in some embodiments a single one of the out-of-alignment rollers may be configured as a pressure-sensing roller or several of the rollers may be configured as sensing rollers.

Figure 10:
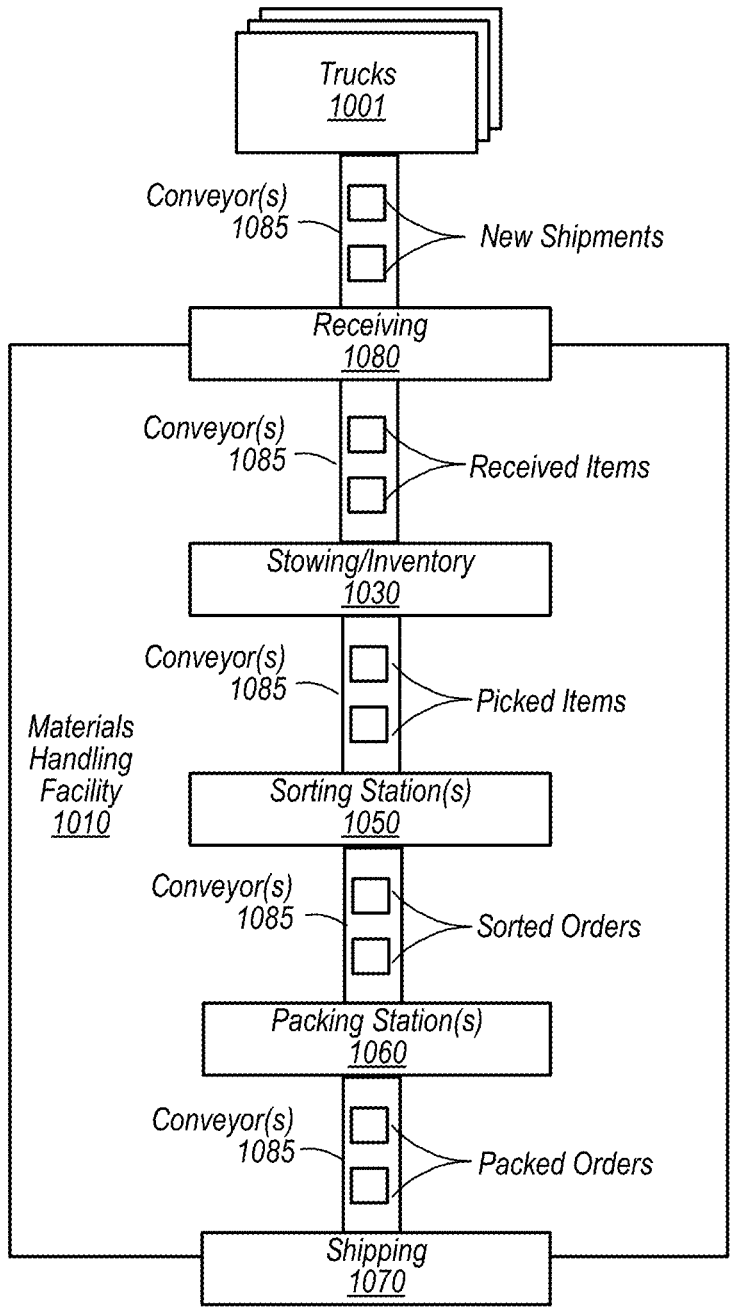
FIG. 10 illustrates a materials handling facility, in some embodiments.

Conveyance systems may be used in a particular portion of a materials handling facility or throughout a materials handling facility. For example, conveyors may be used to move materials or objects from one station or area to another station or area within a materials handling facility. FIG. 10 illustrates a materials handling facility 1010, in some embodiments, wherein conveyors are used throughout the facility.

FIG. 10 illustrates an arrangement of processes and areas within a materials handling facility 1010. Facilities with other areas and processes in other arrangements are contemplated and fall within the scope of this disclosure. For example, sensor-enabled conveyors may be used to measure attributes of in-bound items (e.g., received off of trucks into the facility). In some embodiments, measuring the attributes of in-bound objects may identify broken items before they are accepted by the facility, or may enable return of items without opening the object.

In the depicted facility, trucks 1001 loaded with new shipments are unloaded with conveyors 1085. Conveyors 1085 may comprise any type of conveyance device, described herein, or otherwise. For example, conveyors 1085 may comprise any combination of rollers, belts, movable shelves, carts or the like, any of which may be configured with sensors, as described herein. In one example, belt conveyors may be used to unload new shipments from trucks. The new shipments may be conveyed from the trucks to the receiving area 1080, as illustrated.

Various processes may be performed in the receiving area 1080. For example, pallets or large containers of items may be broken down into smaller sizes, objects or items that may be scanned into the control system, and newly-received items that are not available from inventory may be cross-docked or dirty-picked to fulfill orders. In the depicted embodiment, received items may be conveyed by conveyors 1085 to a stowing station or to an inventory area for stowing. For example, materials handling facilities with robot-based inventory storage may convey received objects to a stowing station where the objects may be stowed onto moveable shelves that are then moved into an inventory area 1030. In some embodiments, materials handling facilities with stationary storage may convey the objects from receiving to an inventory area 1030 via conveyors 1085 (e.g., conveyor belt or roller systems) where agents take the objects from the conveyor and walk through the inventory area, stowing the objects into inventory.

Conveyors 1085 may convey picked items from the inventory area 1030 to sorting stations, in embodiments. For example, in facilities with movable shelves transported by robots, objects may be picked from the movable shelves at an induction station, and placed onto conveyors 1085 (e.g., a conveyor belt). In another example, facilities with non-movable storage may direct agents to navigate among the storage areas, picking items (e.g., from a pick list). The agents may then place the items onto conveyors 1085 (e.g., at an induction station).

In some embodiments, one or more sensors on the conveyors 1085 may measure attributes of the objects placed onto the conveyors to audit or verify the object or process associated with the object. For example, an agent may scan an object (e.g., with a hand held scanner or the like) before placing the object on the conveyor and the sensor(s) of the conveyor may measure attributes of the object. Both the scan information and the measurement information may be sent to a control system (e.g., control system 610) where the scan information and the measurement information may be used to verify or confirm that the object indicated on the conveyor is the right one (e.g., the one that an agent was instructed to pick) or is not broken, for example. Similar and other process may be performed anywhere within the facility.

The objects may be sorted at the sorting station, into orders for example. The illustrated embodiment depicts that sorted orders may be conveyed, via conveyors 1085 to packing stations 1060. Packing stations 1060 may be an area where sorted orders are received and packed into containers to form packages.

In some embodiments, the methods and devices described herein may be used to verify preceding processes or subsequent processes. Sensors may be used with the conveyors 1085, both for objects coming into the packing station 1060 as well as for packages leaving the packing station 1060. For example, sensors may be used to determine characteristics of objects arriving at the packing station, such as whether the right size object (e.g., 10 oz. vs. 20 oz.) has been directed to the packing station and whether all the items of an order have been packed.

For example, the methods and devices described herein may be used to verify that the weight of a packed container corresponds to an expected weight of the packed container just after the container has been packed and placed onto a conveyor for conveyance from the pack station. If the weights do not correspond, the container may be directed to exit the conveyor. For example, the weight of all the items of the shipment plus the packaging and shipping container could be obtained from a data store (e.g., data store 640) and the total weight calculated and compared to the measured weight of the shipment to confirm correct packing.

FIG. 10 illustrates that packed orders may be conveyed via conveyors 1085 to a shipping area 1070. Various processes may be performed at the shipping area. For example, in one embodiment, the processes and devices described herein may be used to determine that a label has been correctly placed on an object such as a container. For example, containers such as shipping containers may be packed at a pack station and sent on a conveyor for further processing downstream. Part of the further processing may include placing a shipping label on the container. The weight distribution of the footprint of the container may be measured at the scheduled time of label application such that the pressure that is applied to the container at the time of label application is translated into the footprint of the container. If the footprint indicates that additional pressure or weight was measured at a particular portion of the footprint, the control system may determine that the label was applied correctly or incorrectly, based on what portion of the footprint indicated additional pressure or weight.

In another example, the weight distribution of the footprint of the object may be used to determine that there is vacant space in the object. For example, if most of the weight is distributed to one end of a long container, it may be determined that any items are at the heavier end of the container and the other end of the container may be determined vacant. In another example, for a given footprint and/or weight distribution and a known weight of items in the container and the packing material, the amount and/or location of free space in the container may be determined. Such determinations may be used to instruct repacking of the items in the container or to issue an alert instructing analysis to determine why too large of a container was used to pack the items, for example.

In embodiments, the processes and devices described herein may be used to determine that an object has fallen off of or become stuck in a component of the conveyance system.

Uses with Other Devices and Processes

The processes and devices described herein may also find applications in bulk material handling. For example, bulk materials handling equipment may be configured with sensors similar to those described herein. In one example, a conveyor may be configured with one or more sensors for a portion (e.g., 3 feet) of the conveyor such that measurements of the physical characteristics of the bulk material being conveyed by the portion can be measured (e.g., weight). The obtained measurements (e.g., 200 lbs.) may be applied to a known velocity (e.g., 6 feet per second) of the conveyor to determine a rate at which the bulk material is being conveyed (e.g., 200 lbs. per 3 feet at 6 feet per second equals a rate of 400 lbs. of material per second).

The processes and devices described herein may be applied to other devices and facilities. For example, a treadmill may be configured with one or more sensors such that measurements of the attributes of the person using the treadmill may be measured and analyzed. For example, analysis of the person's weight distribution on the treadmill may be used to tailor a particular type of workout or determine that the person is no longer operating in a safe manner on the treadmill. For example, analysis of the person's weight distribution with each step might be used to increase or decrease the incline or speed of the treadmill.

The processes and devices described herein may also find applications with tracked vehicles. For example, the tracks of tracked vehicles may be equipped with one or more sensors similar to those described herein. Analysis of the measurements obtained via the sensors of the tracked vehicle may be used to adjust the amount of power applied to the tracks to provide feedback to the operator of the tracked vehicle about how the weight of the vehicle is being distributed across the tracks of the vehicle. In some embodiments, analysis of the measurements received from the sensors may be used to determine an unsafe condition and issue a warning or suggest a maneuver.

Figure 11:
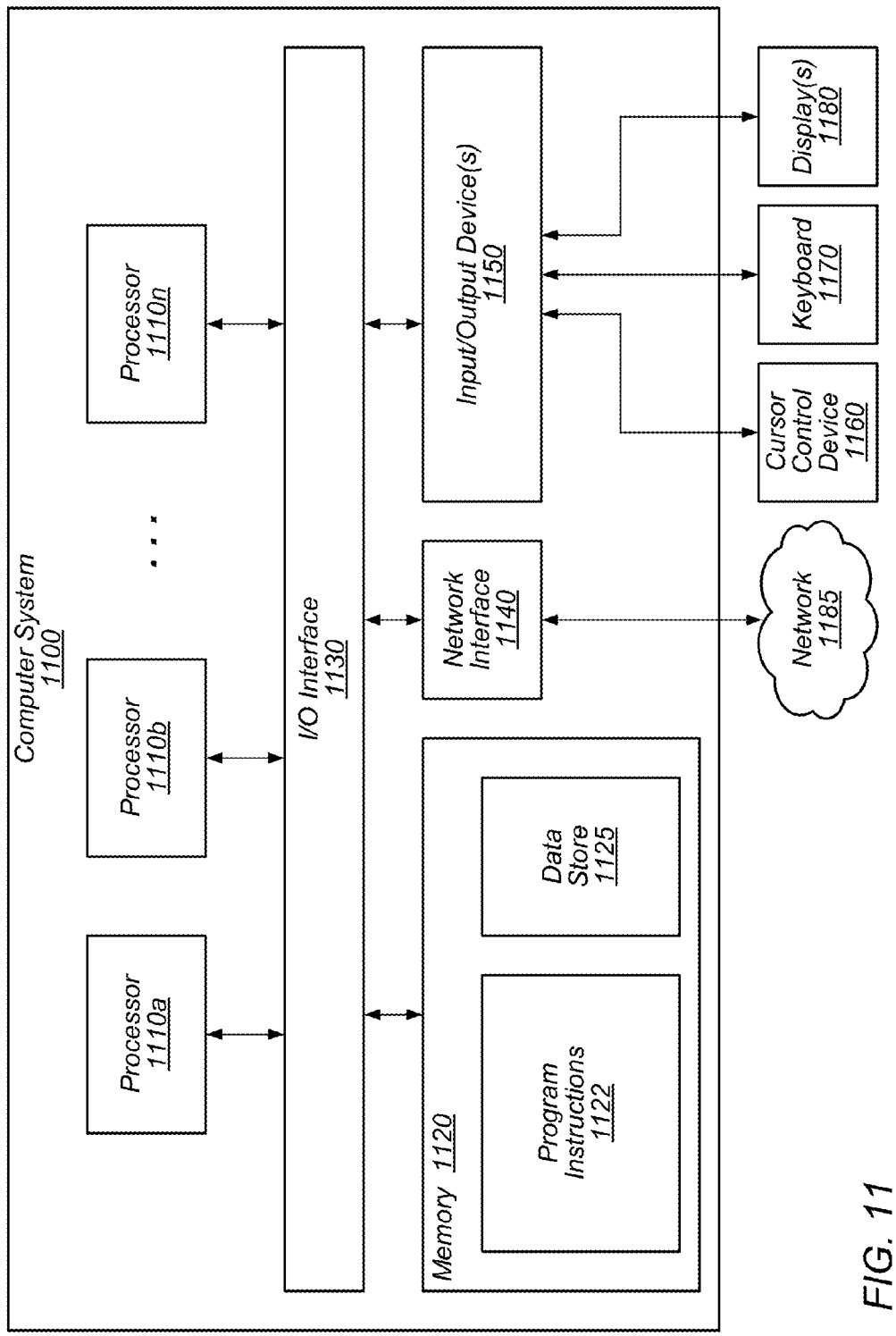
FIG. 11 illustrates a computing system, according to some embodiments.

FIG. 11 illustrates a computing system, according to some embodiments. In some embodiments, a device that implements a portion or all of one or more of the technologies, including but not limited to the various sensor-enabled conveyance devices and associated processes (e.g., control processes) as described herein, may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, MIPS ISAs, RISC or any other suitable ISA, such as systems-on-chips (SoC). In multiprocessor systems, each of processors 1110 may commonly, but not necessarily, implement the same ISA.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, components and techniques for a materials handling facility, are shown stored within system memory 1120 as program instructions 1122 and data store 1125.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network or networks 1185, such as other computer systems or devices as illustrated in FIGS. 1, 4A, and 6 and others described herein, for example. In various embodiments, network interface 1140 may support communication via any suitable wired or wireless general data networks, such as cellular networks, Ethernet networks, or Wi-Fi networks for example. Network interface 1140 may support communication via telecommunications/telephony networks such as analog voice networks or digital fiber communications networks, via storage area networks such as Fiber Channel SANs, or via any other suitable type of network and/or protocol.

In some embodiments, system memory 1120 may be one embodiment of a computer-accessible medium configured to store program instructions and data for implementing embodiments of data transfer and storage methods as described above relative to FIGS. 1, 4A, and 6-10. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

What is claimed is:

1. A materials handling facility, comprising:
sensors configured to obtain dynamic measurements of attributes of an object as the object is conveyed via a conveyance system in the materials handling facility, the sensors configured as part of the conveyance system, wherein a motion of the sensors substantially matches a motion of the object during conveyance via the conveyance mechanism; and
a control system comprising a conveyor control module configured to:
direct conveyance of the object via the conveyance system to or from areas within the materials handling facility;
receive, via the sensors, initial dynamic measurements of one or more attributes of the object while the object is conveyed;
determine one or more characteristics of the object conveyed based on the initial dynamic measurements; and
based on the determined one more characteristics, select a particular materials handling facility process for the object.

2. The materials handling facility of claim 1, wherein the conveyor control module is further configured to:
calculate one or more inertial properties of the object based on the dynamic measurements; wherein said determination of one or more characteristics comprises determination of said calculated one or more inertial properties.

3. The materials handling facility of claim 1, wherein the conveyor control module is further configured to:
instruct the conveyance system to actuate at a velocity;
instruct the conveyance system to change the velocity such that the object conveyed via the conveyance system changes velocity while the object rests on the sensors of the conveyance system;
subsequent to instruction of the change of velocity,
receive additional dynamic measurements of one or more attributes of the object; and
determine the one or more characteristics of the object based at least in part on the initial and additional dynamic measurements.

4. The materials handling facility of claim 3, wherein to instruct change of the velocity, the conveyor control module is configured to instruct the conveyance system to perform one selected from speed up, slow down, stop, start, stagger, vibrate or change direction.

5. The materials handling facility of claim 1, wherein the particular materials handling facility process for the object is one selected from issue an alert, direct the object to a particular area or process in the materials handling facility, associate the determined one or more characteristics with the object and save the determined characteristics as characteristics of the object or confirm one or more attributes of the object for a preceding or a subsequent process.

6. A method, comprising:
performing, by a control system comprising one or more processors:
directing conveyance of an object via a conveyance system to or from an area within a materials handling facility, the conveyance system comprising sensors configured as part of the conveyance system, wherein a motion of the sensors substantially matches a motion of the object during conveyance via the conveyance mechanism;
receiving, via the sensors, initial dynamic measurements of one or more attributes of the object while the object is conveyed;
determining one or more characteristics of the object conveyed based on the initial dynamic measurements; and
based on the determined one more characteristics, select a particular materials handling facility process for the object.

7. The method of claim 6, wherein the one or more attributes of the object comprises at least one of footprint, weight, or weight distribution.

8. The method of claim 6, wherein the one or more characteristics of the object comprises at least one of quantity, state of matter within the object, placement of labels, stability, or tightness of packing within the object.

9. The method of claim 6, further comprising:
instructing the conveyance system to actuate at a velocity;
instructing the conveyance system to change the velocity such that the object conveyed via the conveyance system changes velocity while the object rests on the sensors of the conveyance system;
subsequent to instructing the change of velocity,
receiving additional dynamic measurements of one or more attributes of the object; and
determining the one or more characteristic of the object based at least in part on the initial and additional dynamic measurements.

10. The method of claim 9, further comprising:
determining at least one characteristic of an item within the object based on the determined characteristic of the object, wherein the at least one characteristic of the item within the object is determined without opening the object.

11. The method of claim 6, wherein the determined characteristic of the object is an inertial property of the object including one of weight transfer or oscillation.

12. The method of claim 6, further comprising:
analyzing the determined one or more characteristics of the object to determine what type of item is within the object.

13. A non-transitory computer-accessible storage medium storing program instructions that when executed by one or more processors implement a control system configured to perform:

directing conveyance of an object via a conveyance system to or from an area within a materials handling facility, the conveyance system comprising one or more sensors configured as part of the conveyance system, wherein a motion of the sensors substantially matches a motion of the object during conveyance via the conveyance mechanism;

receiving, from the one or more sensors, initial dynamic measurements of one or more attributes of the object while the object is conveyed;

determining one or more characteristics of the object conveyed based on the initial dynamic measurements, wherein at least one of the one or more characteristics is a weight distribution of the object; and based on the determined one more characteristics, selecting a particular materials handling facility process for the object.

14. The non-transitory computer-accessible storage medium of claim 13, wherein the control system is further configured to perform:

directing the object to a portion of the conveyance system configured to jostle the object;

subsequent to said directing the object to the portion of the conveyance system, receiving additional dynamic measurements of one or more attributes of the object, wherein the one or more additional dynamic measurements are different from the initial dynamic measurements due to the jostling; and determining the one or more characteristic of the object based at least in part on analysis of the initial and additional dynamic measurements.

15. The non-transitory computer-accessible storage medium of claim 13, wherein the particular materials handling facility process for the object is selected from one of directing the object to exit the conveyance system, issuing an alert that the object has fallen off the conveyance system, or directing inspection of the object.

16. The non-transitory computer-accessible storage medium of claim 13, wherein directing conveyance of an object via the conveyance system to or from areas within the materials handling facility comprises directing conveyance of the object via at least one roller or conveyor belt configured with the one or more sensors.

17. The non-transitory computer-accessible storage medium of claim 13, wherein the determined one or more characteristics of the object further comprises the weight of the object and wherein the control system is further configure to perform:

obtaining or calculating an expected weight of the object;

comparing the expected weight to the measured weight of the object; and wherein the selected particular materials handling facility process comprises issuing an alert for the object when the expected weight does not match the measured weight.

18. The non-transitory computer-accessible storage medium of claim 13, wherein the selected particular materials handling facility process comprises:

generating an image of a footprint of the object based on the initial dynamic measurements; and sending the generated image of the footprint to a display for display on the display, wherein the generated image of the footprint illustrates the weight distribution of the object.

19. The non-transitory computer-accessible storage medium of claim 13, wherein the control system is further configured to perform:

generating, based upon the initial dynamic measurements of the one or more attributes of the object, a footprint indicating the weight distribution of the object; and comparing the weight distribution of the footprint of the object to one or more footprint templates, wherein selecting the particular materials handling facility process comprises selecting the particular materials handling facility process based on the footprint template that matches the footprint of the object.

20. The non-transitory computer-accessible storage medium of claim 13, wherein the area of the materials handling facility that the objects may be directed to or from comprise one of a receiving area, inventory area, sorting station, packing station, or shipping area.

\* \* \* \* \*